United States Patent [19]

Dietz et al.

[11] Patent Number: 5,891,977

[45] Date of Patent: Apr. 6, 1999

[54] ORGANOPOLYSILOXANES COMPRISING POLYHYDROXYORGANYL RADICALS AND POLYOXYALKYLENE RADICALS

[75] Inventors: Thomas Dietz; Burghard Grüning, both of Essen, Germany; Peter Lersch, Midlothian, Va.; Christian Weitemeyer, Essen, Germany

[73] Assignee: Th. Goldschmidt AG, Essen, Germany

[21] Appl. No.: 82,384

[22] Filed: May 20, 1998

[30] Foreign Application Priority Data

May 22, 1997 [DE] Germany .......................... 197 21 353.7

[51] Int. Cl.⁶ .......................... C08G 18/00; C08G 77/06; C08G 77/04; C08L 83/00
[52] U.S. Cl. .......................... 528/15; 424/70.12; 521/112; 524/588; 556/450; 528/29
[58] Field of Search ........................ 528/15, 29; 521/112; 524/588; 556/450

[56] References Cited

U.S. PATENT DOCUMENTS

| | | | |
|---|---|---|---|
| 5,639,844 | 6/1997 | Blum et al. ................................ | 528/15 |
| 5,654,362 | 8/1997 | Schultz et al. ........................... | 524/682 |
| 5,661,202 | 8/1997 | Akamatsu et al. ....................... | 528/15 |
| 5,750,643 | 5/1998 | Blum et al. .............................. | 528/15 |

FOREIGN PATENT DOCUMENTS

| | | |
|---|---|---|
| 393 509B | 11/1991 | Australia . |
| 2646672 | 11/1990 | France . |
| 43 06041 | 9/1994 | Germany . |
| 43 18 537 | 12/1994 | Germany . |
| 43 18 539 | 12/1994 | Germany . |

OTHER PUBLICATIONS

English language patent specification identified as AT 393 509B which relates to Australian Appln. No. 393 509B previously submitted with IDS of Aug. 20, 1998.

Laid–Open Specification identified as DE 43 06 041 A1 which relates to German Appln. No. 43 06 041 A1 previously submitted with IDS of Aug. 20, 1998.

*Primary Examiner*—Morton Foelak
*Attorney, Agent, or Firm*—Frommer Lawrence & Haug LLP

[57] ABSTRACT

The present invention relates to organopolysiloxanes comprising polyhydroxyorganyl radicals, especially sugar radicals or sugar-derivative radicals, and polyoxyalkylene radicals, to processes for their preparation and to their use.

25 Claims, No Drawings

ORGANOPOLYSILOXANES COMPRISING POLYHYDROXYORGANYL RADICALS AND POLYOXYALKYLENE RADICALS

RELATED APPLICATIONS

This application claims priority to German application No. 197 21 353.7, filed May 22, 1997, herein incorporated by reference.

BACKGROUND OF THE INVENTION

1. Field of the Invention

The present invention relates to organopolysiloxanes comprising polyhydroxyorganyl radicals, especially sugar radicals or sugar-derivative radicals, and polyoxyalkylene radicals, to processes for their preparation and to their use.

2. Description of the Related Art

Reaction products of siloxanes and sugars and/or sugar derivatives, and processes for their preparation, as well as their use in surfactant applications in the production of glass fibers, or for modifying contact lenses, are known. Various synthesis paths for the linking (hydrophilic) sugar radicals to appropriate functional siloxanes by way of hydrolysis-stable Si—C bonds are described in the technical and patent literature.

AT-A-393 509, for example, describes the synthesis of saccharide-modified siloxane compounds by hydrosilylating organohydridosiloxanes with saccharides that contain C—C multiple bonds. This method, however, has the disadvantage that the reaction proceeds selectively only in the presence of protective groups.

A reaction of amino-functional polysiloxanes with sugar lactones is the subject of DE-A-43 18 539. The resulting linkage via an amide bond, however, is of only limited stability to hydrolysis when these materials are used in aqueous media.

FR-A-2 646 672 describes the reaction of epoxy-functional polysiloxanes with sugar derivatives, such as gluconic acid. Here again, the use of these materials in aqueous media is limited by the sensitivity of the ester bond to hydrolysis.

A further option starts from hydroxyalkylsiloxanes, which are reacted with saccharides in an acid-catalyzed glycosidation reaction as described, for example, in DE-A-43 06 041. In this described mode of reaction, however, it is necessary to operate with an excess of hydroxyalkylsiloxane in order to obtain the defined products with low degrees of glycosidation. The excess hydroxyalkylsiloxane cannot be separated off and remains in the product, where under certain circumstances it may adversely affect the desired properties of the sugar siloxane. In addition, the use of the acidic catalyst induces degradation reactions on the siloxane chain.

DE-A-43 18 537 claims various routes for preparing siloxanyl-modified polyhydroxylated hydrocarbons, such as the hydrosilylation of propynyl glucoside with SiH-sil(ox)anes or the reaction of epoxy-functional di- and trisiloxanes with sugar amines, such as glucamine. The synthesis routes indicated here again have the problem that it is necessary first of all to overcome the pronounced difference in polarity between the (hydrophilic) sugar radical and the (hydrophobic) siloxane radical. For this purpose a description is given of multistage synthesis paths, having recourse, inter alia, to known protective-group chemistry. The reaction times required to modify even siloxane compounds of low functionality and low molecular mass are already long, even if high temperatures, autoclave pressures and considerable amounts of solvent are used. As the molecular weight of the siloxanes increases, the problems in compatibility mount up in such a way that the reaction rates that can be achieved become negligibly small. Consequently, although the methods described might possess some preparative significance, their conversion to the industrial production scale appears impracticable for the reasons set out above.

The principle known from DE-A-43 06 041 is utilized by U.S. Pat. No. 5,428,142 to prepare silicone-based glycosides by reacting polyethersiloxanes in this case, as starting materials, with saccharides or saccharide derivatives in the presence of an acidic catalyst. Here, the reaction of the OH group of the polyether with the saccharide results in linkage via an acetal group, but with the polyether radical functioning only as a spacer between the siloxane skeleton and the sugar. This modification gives materials which possess good emollient properties, are substantive with respect to the hair and skin, and have inverse cloud points.

The methods of DE-A-43 06 041 have additional disadvantages. For instance, the methods described in this patent for preparing siloxane glycosides are characterized by low rates of reaction, as are commonly observed in the case of polyethersiloxanes containing long-chain and/or terminally secondary OH-functional polyether radicals. This leads to uneconomical long reaction times or to high temperature stresses, both of which impair the color and properties of the resulting products. Here again, the use of the acidic catalyst may induce degradation reactions on the siloxane chain. In addition, the method indicated is restricted to only OH-functional silicone polyethers as starting materials. Reactions with terminally capped silicone polyethers, which are modified at the ends and carry, for example, a polar ester or ether group, are in principle not possible.

The task was to overcome the disadvantages described above, and the various further disadvantages known from the prior art, in relation to the synthesis of siloxane-sugar derivatives.

OBJECT OF THE INVENTION

Surprisingly it has been found now that novel ternary organopolysiloxane copolymers, in which polyether radicals and polyhydroxyorganyl radicals are present alongside one another, independently, attached to the siloxane structure without being linked via the OH functionality of the polyether, can be prepared in a simple manner by various synthesis paths. In addition, and unexpectedly, the materials of the invention also exhibit particular properties, on the basis of which they can be used as silicone surfactants. In fact, the inverse cloud point typical of polyethersiloxanes, i.e. the clouding of their aqueous solutions on heating, can be raised in a targeted manner, or eliminated entirely, by playing on or varying the ratio of polyhydroxyorganyl radicals to polyether radicals in the siloxane copolymers of the invention. In contrast, this cannot be achieved with mixtures of polyhydroxy-organylsiloxane and polyethersiloxane.

SUMMARY OF THE INVENTION

The present invention therefore provides organopolysiloxane copolymers comprising on average at least one polyhydroxyorganyl group and/or sugar group or sugar-derivative group, attached to the siloxane via a spacer, and on average at least one polyoxyalkylene group, of the general formula:

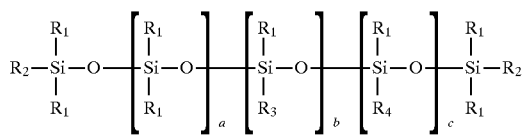

where
R₁=alkyl radical of 1 to 4 carbon atoms,
R₂=R₁, R₃ and/or R₄,
and where the indices a, b, and c are integers within the stated ranges
a=0 to 200,
b=0 to 50,
c=0 to 50,
with the proviso that at least one radical R₃ and R₄ is present in each case,
in particular for b=0 and c≧1 at least one of the two radicals R₂ then corresponds to a radical R₃,
for c=0 and b≧1 at least one of the two radicals R₂ then corresponds to a radical R₄,
and for b=c=0 the two radicals R₂ then correspond each to a radical R₃ and to a radical R₄,
the ranges for a, b and c are preferably
a=1 to 150,
b=1 to 30, especially 10,
c=1 to 30, especially 10,
with particular preference
a=10 to 100,
b=1 to 20, especially 4,
c=1 to 20, especially 4,
and the quotient b/c can adopt values of preferably about 0.1 to about 10, with particular preference about 0.25 to about 4,
R₃=polyoxyalkylene radical of random or blockwise composition and of the general average formula

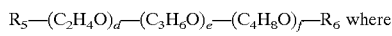

R₅—(C₂H₄O)_d—(C₃H₆O)_e—(C₄H₈O)_f—R₆ where d=0 to 100,
e=0 to 100,
f=0 to 100,
with the proviso that at least one of the indices d, e or f is≧1,
R₅=alkyleneoxy radical having 1 to 20 carbon atoms which is optionally branched and/or can contain double bonds,
R₆=hydroxyl, alkoxy or acyloxy radical having 1 to 20 carbon atoms,
R₄=radical of the general formula —R₇—PH, where the radical R₇ functions as spacer between siloxane skeleton and polyhydroxyorganyl radical and/or sugar radical and is of the type known from the prior art for polyhydroxy-organyl-and/or sugar-modified siloxanes, with the exception of a polyether radical,
PH is a polyhydroxyorganyl radical containing a defined number n of (C—OH) groups, where n is≧2, preferably from 2 to 30 and particularly preferably from 5 to 15.

DESCRIPTION OF THE PREFERRED EMBODIMENTS

The compound involved here is, in particular, a mono-, di-, oligo- or polysaccharide, or its glycosides or corresponding derivatives. Examples thereof are glucose, maltose, raffinose, sorbitol, glucosamine, glucopyranosylamine, glucamine, N-methylglucamine, isomaltamine, gluconic acid and heptagluconic acid.

Customary spacer groups R₇ are derived from compounds possessing firstly a C—C multiple bond capable of hydrosilylative addition onto hydridosiloxanes and secondly a reactive group capable of reaction with the polyhydroxy compound and/or the sugar or sugar derivative. Examples of such compounds are alkenyl or alkynyl alcohols, such as allyl alcohol, hexenol or propynyl alcohol, alkenylamines, such as allylamine, N-ethylmethallylamine or N-aminoethyl-allylamine, and epoxy-functional alkenes, such as allyl glycidyl ether or vinylcyclohexene oxide.

The nature of the chemical linkage between spacer R₇ and the polyhydroxyorganyl radical PH results from the methods, known from the prior art, of linking polyhydroxyorganyl compounds and/or sugars with siloxanes. The linkage can take place, for example, by way of an acetal, ester, amide, ether, thioether or amine bond. Preference, however, owing to their stability to hydrolysis, is given to an ether, thioether or amine bond, as is obtained, for example, by reacting an amino-functional sugar derivative with an epoxy-functional siloxane.

The present invention also provides for the use of the polysiloxane copolymers in surfactant applications, especially as silicone surfactants.

The special nature of this new class of compounds is that the various radicals are present alongside one another and independently of one another in the molecule. In contradistinction to the silicone polyether glycosides claimed in U.S. Pat. No. 5,428,142 there exists the possibility that the polyether radicals are not end-capped. Furthermore, it is possible to produce all desired proportions of sugar radicals to polyether radicals, including in particular those greater than 1, something which is not possible in the case of the prior art silicone polyether glycosides, since the sugar radical is attached directly to the polyether radical and hence it is not possible to introduce any more sugar radicals into the molecule than there are polyether radicals.

Another important advantage of the polyhydroxyorganyl-polyoxyalkylene-siloxane copolymers claimed herein over the prior art silicone polyether glycosides is that the linkage of the sugar radical with the siloxane is thermally stable and stable to hydrolysis, since it does not comprise an acid- and temperature-sensitive acetal bond.

The novel siloxane copolymers can be prepared in a known manner by hydrosilylation reactions. For this purpose, organohydridosiloxanes are reacted in the presence of a hydrosilylation catalyst and simultaneously or in succession with polyethers containing C—C multiple bonds and with polyhydroxyorganyl compounds containing C—C multiple bonds. It is possible for these latter compounds to be present in protected form if desired. However, it is particularly advantageous in a first step to react, not directly the polyhydroxyorganyl compounds but rather a compound of attenuated polarity that is more compatible with the organohydridosiloxane. Then, in a subsequent step, the polyhydroxyorganyl compound is bonded by a chemical reaction to the siloxane, which has already undergone polar modification. The advantage of the latter process for preparing these novel ternary siloxanes is that their precursor, which already includes the polyether radical, is more compatible with the sugar (derivative) and, consequently, that the reaction thereof proceeds more gently and more rapidly than if the procedure was carried out starting directly from the (hydrophobic) siloxane and the (strongly hydrophilic) sugar (derivative).

It is true that this principle has also been applied in U.S. Pat. No. 5,428,142 to the glycosidation of polyethersiloxanes. However, in that case it is necessary to accept the disadvantages already mentioned above. Consequently, this method represents a novel route, in particular, to high molecular mass and temperature-stable sugar siloxanes whose preparation by a direct path has not been possible before for the reasons described above. The two-stage process carried out in the examples eliminates all of the disadvantages described in the prior art in relation to the processes for preparing sugar siloxanes—the use of protective groups, excess sugar, degradation reactions on the siloxane, formation of hydrolysis- and heat-sensitive bonds, and long reaction time.

Additionally and unexpectedly, the materials of the invention also exhibit properties which make them useful as silicone surfactants having special qualities. These special qualities result specifically from the presence alongside one another of free polyether radicals and polyhydroxyorganyl radicals and/or sugar (-derivative) radicals in these ternary silicone copolymers. Silicone polyethers belong to the class of nonionic surfactants which show inverse solubility behavior in water. In other words, they decrease in solubility as the temperature rises. This behavior is defined by what is known as the inverse cloud point. For a detailed explanation, reference may be made to the literature (Vol. 1 and 23, Nonionic Surfactants from the Surf. Science Series, ed.: Martin Schick). Silicone sugars are likewise nonionic surfactants that exhibit a "normal" solubility behavior. In other words, their solubility in water improves constantly as the temperature climbs. Therefore, through an appropriate balance of polyether groups and sugar groups at molecular level, as in the compounds claimed herein, it is possible to prepare silicone surfactants with custom-tailored solubility parameters, which are of interest, for example, as emulsifiers for use in microemulsions. This effect cannot be obtained with mixtures of corresponding proportions of a pure sugar siloxane and of a pure polyethersiloxane (see Tab. 3). Indeed, in order to be able to prepare solutions of such mixtures, it is necessary to make up solutions of the two siloxanes separately and then combine them, since the pure components demonstrate inadequate mutual miscibility owing to their pronounced difference in polarity.

It has also been found that the novel ternary sugar-polyether-siloxanes feature a greatly increased stability in water in comparison with corresponding binary sugar siloxanes. Pure sugar siloxanes, in fact, despite the large number of OH groups, are of poor solubility in water, probably owing to the formation of aggregates as a consequence of strong hydrogen bonds. In contrast, the compounds of the invention, with their high polarity, can be employed as surface-active substances in preferably polar, especially aqueous media, in particular in situations where the favorable properties of the siloxane radical are also desired, such as its substantivity with respect to organic or inorganic materials.

The application provides, furthermore, a process for preparing the compounds of the invention which is composed of two stages. An underlying feature is that the (nonpolar) siloxane is "rendered polar" beforehand in the first stage, by adduct formation with a polyether,. Thus, in the second stage it can be reacted rapidly and gently with a markedly more polar polyhydroxyorganyl compound, since the co-reactants are more compatible with one another than if a (nonpolar) siloxane was reacted directly with a polar compound. It is possible, for example, to carry out the partial reaction of an organohydridosiloxane with a polyether in a hydrosilylation reaction, and the subsequent reaction of the residual SiH groups with a polyhydroxyorganyl compound comprising C—C multiple bond. A further example of this approach is the cohydrosilylation of a polyether and of another compound comprising C—C multiple bond that contains a functional group which is capable of reaction with a polyhydroxyorganyl compound and hence brings about the linking of the polyhydroxyorganyl radical to the siloxane. This process is employed in the examples described below, where an organohydridosiloxane is hydrosilylated with a mixture of a polyether and allyl glycidyl ether, which contains a reactive epoxide group, and then the polyether-epoxysiloxane is reacted with an amino sugar to give the polyether-sugar-siloxane, with the formation of a heat- and hydrolysis-stable amino group.

EXAMPLES

Examples of compounds of the invention are:

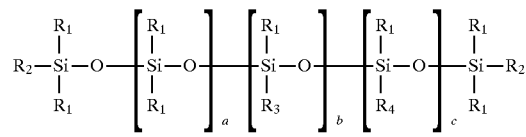

a) a=1, b=1, c=1
$R_2=R_1$

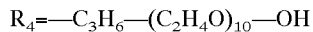

$R_4$=—$C_3H_6$—$(C_2H_4O)_{10}$—OH b) a=25, b=5, c=5
$R_2=R_1$
$R_3$=—$C_3H_6$—NH—CO—$(CHOH)_4CH_2OH$
$R_4$=—$C_3H_6$—$(C_2H_4O)_5$—$(C_3H_6O)_5$—$OCH_3$ c) a=1, b=1, c=1
$R_2=R_3$
$R_3$=—$C_3H_6$—O—$CH_2$(CHOH) $CH_2$—O—CO—$(CHOH)_4CH_2OH$
$R_4$=—$C_6H_{12}$—$(C_2H_4O)_{10}$—$(C_3H_6O)_3$—OH

Starting compounds employed are polysiloxanes having lateral and/or terminal SiH groups, as are known from the prior art. The preferred organopolysiloxanes are linear polymers of the general formula:

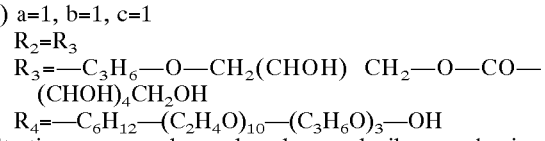

where g=a and h=b+c, $R_2=CH_3$ or H and the siloxane comprises preferably from 10 to 90 mol-% of SiH-containing siloxy units.

The initial, partial reaction of the SiH groups with the polyether radical takes place in a hydrosilylation reaction at elevated temperatures, preferably at from 50 to 150° C., in the presence of hydrosilylation catalysts known from the prior art, such as $H_2PtCl_6$, for example. As polyether compound it is possible to employ compounds from the class of the polyoxyalkylene compounds which can be described by the general structural formula $CH_2$=CH—$R_8$—$(C_2H_4O)_d$—$(C_3H_6O)_e$—$(C_4H_8O$—$)_f$—$R_6$, where d=0 to 100, e=0 to 100, f=0 to 100, with the proviso that at least one of the indices d, e or f is ≧1, $R_8$=alkyleneoxy radical having 1 to 18 carbon atoms, which is optionally branched and/or can contain double bonds, $R_6$=hydroxyl, alkoxy or acyloxy radical having 1 to 20 carbon atoms.

The subsequent reaction of the remaining SiH groups of the polyether-functional siloxane then takes place either by direct introduction of a reactive polyhydroxyorganyl compound or first of all by analogous reaction with an intermediate that is capable of further reaction, and which then, in a further reaction step, is reacted with a polyhydroxyorganyl compound.

As polyhydroxyorganyl compound it is possible to employ compounds from the class of the allyl glycosides, sugar lactones, sugar amines, glucuronic acids, e.g. allyl glucopyranoside, glucono-δ-lactone, but preferably those sugar siloxanes which form hydrolysis-stable linkages with the siloxane, such as sorbitol, glucamine or N-methylglucamine.

If the reaction regime permits, some or all of these intermediate stages are advantageously combined. In this context it is possible to operate either without solvent or in a suitable inert solvent, which is separated off after the end of the reaction or else, depending on the intended end use, remains in the product.

The modified polysiloxanes of the invention can be employed in diverse applications. They are particularly suitable for use in aqueous media, from which they develop their action on the basis of their surface activity and their surface affinity. Depending on their structure, they may improve the surface qualities of the coating when used in paints and inks. They can be employed as oil-in-water or water-in-oil emulsifiers or may be used, for example, in cosmetic preparations for the cleansing of skin and hair, for improving the foam and for conditioning the hair, and/or for obtaining a pleasant sensation on the skin. Naturally, the modified polysiloxanes of the invention are frequently employed together with surfactants and other additives for influencing the surface qualities. All said formulations may comprise the known additives, examples of which are: wetting agents, surfactants or emulsifiers from the classes of the anionic, cationic, zwitterionic, amphoteric or nonionic surface-active substances; for example, fatty alcohol sulfates, fatty alcohol ether sulfates, alkyl-sulfonates, alkylbenzenesulfonates, alkyl sulfosuccinates, quaternary ammonium salts, alkyl betaines, carboxamido-alkyl betaines, derivatives of monomeric saccharides or of saccharides with higher degrees of condensation, ethoxylated fatty alcohols, fatty acid alkanolamides or ethoxylated fatty acid esters, thickeners, such as, for example, kaolin, bentonite, fatty acids, higher fatty alcohols, starch, polyacrylic acid and derivatives thereof, cellulose derivatives, alginates, petroleum jelly or liquid paraffin.

The use of the compounds of the invention as textile assistants, as additives in the production of polyurethane foam, or in the formulation of additive packets for fuels is also conceivable.

The examples which follow illustrate the present invention. Examples 7 and 8 are examples not in accordance with the invention that are used for comparison.

EXAMPLE 1

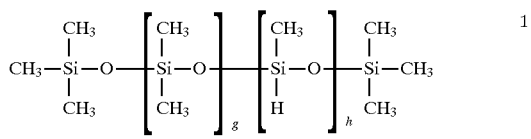

In a 2 l four-necked flask equipped with reflux condenser, stirrer, dropping funnel and thermometer, 821 g (1.04 mol) of a polyoxyalkylene polymer, prepared starting from allyl alcohol, of the general formula $CH_2=CH-CH_2-O-(C_2H_4O)_d-(C_3H_6O-)_e-OH$, having an average molecular weight of 789 g/mol and indices of d=10 and e=5 (referred to for short below as allyl polyether P), 29.7 g (0.26 mol) of allyl glycidyl ether and 25 mg of $H_2PtCl_6$ (10 ppm Pt, based on overall batch) are heated with stirring to temperature of 110° C. At this temperature, 359 g (1 mol of SiH) of a laterally SiH-functionalized polydimethylsiloxane of the general formula 1 with the indices g=30 and h=8 are added dropwise at a rate such that, despite the ensuing exothermic reaction, a temperature of 130° C. is not exceeded. After the end of the addition, the reaction mixture is stirred at 110° C. until a conversion check by way of the SiH value shows that the siloxane has been reacted completely. The reaction is terminated at a conversion>99% and the platinum catalyst residues are removed from the reaction mixture by filtration. The excess of allyl glycidyl ether, and volatile by-products, are removed by distillation under an oil pump vacuum. The resulting reaction product is a brownish yellow, low-viscosity oil of the expected average composition 2, which has an epoxy value of 0.25% and a ratio of epoxide/polyether of approximately 1:4.

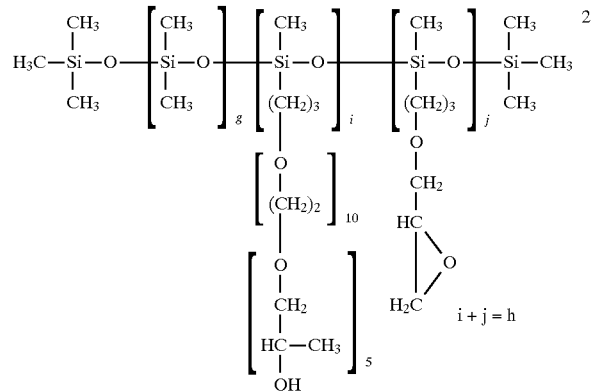

For the subsequent modification of the polyether-epoxy-siloxane 2, a suspension of 4.39 g (0.0225 mol) of N-methylglucamine in 37.5 g of isopropanol is heated under reflux to boiling in a 500-ml four-necked flasked equipped with reflux condenser, stirrer, dropping funnel and thermometer. At this temperature, 144 g (0.0225 mol of epoxide) of the polyether-epoxy-siloxane 2 are added rapidly dropwise and the reaction mixture is maintained at reflux until, after about 1.5 h, a clear solution is obtained. Following the addition of a further 12.5 g of isopropanol the reaction mixture is heated under reflux for 4 h more. After cooling, the product is filtered. The reaction product obtained is a slightly cloudy, pale yellow oil of average composition 3 with the indices g=30, i=6.4, j=1.6, which solidifies to form a yellow, resinous mass when the solvent is stripped off in vacuo. For greater ease of handling, the product is employed in undistilled form for its further use, as an isopropanolic solution having a solids content of 75.7%.

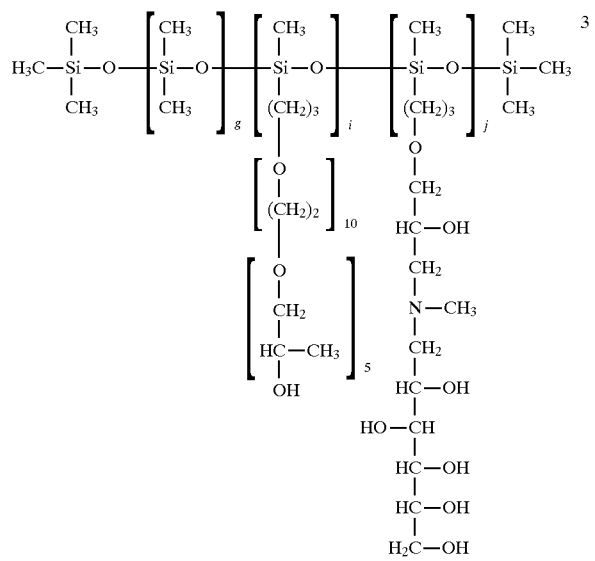

EXAMPLES 2 to 10

In a manner similar to that described in Example 1, the hydridosiloxane 1 is reacted in a cohydrosilylation reaction while varying the proportion of allyl polyether P to allyl glycidyl ether. The reaction products obtained in each case are pale yellow to brown, clear to slightly cloudy, mobile oils each corresponding to the theoretically expected composition and having the epoxy values set out in Tab. 1. Subsequently, under the conditions already described, these polyether-epoxy-siloxanes are reacted with N-methylglucamine. This gives clear to cloudy, pale yellow to brownish yellow oils of average composition 3 with the indices and solids contents that are likewise indicated in Tab. 1. Example 7 involves a sugar siloxane which is not in accordance with the invention, this compound being as claimed in DE-A-43 18 537 and prepared in a manner similar to that described. Example 8 again involves a polyethersiloxane which is not in accordance with the invention and whose preparation is described in numerous patents. Examples 7 and 8 were selected in order to delimit the properties of the siloxane-polyether-sugar copolymers claimed herein from the properties of the pure polyethersiloxanes and of the pure sugar siloxanes.

TABLE 1

Experimental details for Examples 1 to 11

| Ex. No. | Indices g/h of 1 | Ratio employed of allyl glycidyl ether to P | Epoxy value [%] of 2 | Sugar radical as a proportion [%] of the sum of sugar and polyether radicals | Solids content [%] of the isopropanolic solution of 3 | Product |
|---|---|---|---|---|---|---|
| 1 | 30/8 | 1:4 | 0.25 | 23.3 | 75.7 | A |
| 2 | | 1:2.33 | 0.41 | 28.8 | 78.3 | B |
| 3 | | 1:1.5 | 0.56 | 35.4 | 76.7 | C |
| 4 | | 1:1 | 0.85 | 49.4 | 80.0 | D |
| 5 | | 1:0.67 | 1.12 | 58.5 | 75.2 | E |
| 6 | | 1:0.25 | 1.92 | 78.8 | 72.3 | F |
| 7 | | 1:0 | 2.56 | 100 | 66.5 | G |
| 8 | | 0:1 | — | 0 | 100 | H |
| 9 | 18/7 | 1:1,5 | 0.63 | 37.0 | 76.1 | I |

TABLE 1-continued

Experimental details for Examples 1 to 11

| Ex. No. | Indices g/h of 1 | Ratio employed of allyl glycidyl ether to P | Epoxy value [%] of 2 | Sugar radical as a proportion [%] of the sum of sugar and polyether radicals | Solids content [%] of the isopropanolic solution of 3 | Product |
|---|---|---|---|---|---|---|
| 10 | | 1:1 | 0.91 | 47.7 | 77.5 | J |
| 11 | | 1:0.67 | 1.08 | 51.1 | 78.0 | K |

Technical Performance Section

The materials of the invention exhibit properties on the basis of which they can be used as silicone surfactants having special qualities. This special quality results specifically from the presence alongside one another of free polyether radicals and polyhydroxyorganyl radicals and/or sugar (-derivative) radicals in these ternary silicone copolymers.

Solubility

TABLE 2

Solubility of the polyethersiloxane H, the amino sugar siloxane G and two amino sugar polyether-siloxanes C and E in water

| Product | Appearance of a 1% strength aqueous solution [1] |
|---|---|
| H | clear, homogeneous |
| C | clear, homogeneous |
| E | opaque, homogeneous |
| G | cloudy[2] |

[1] The solutions each contain the same amount of isopropanol
[2] A precipitate is formed after a few hours The solubility in water of two amino sugar-polyether-siloxanes is investigated in comparison with a pure polyethersiloxane and a pure sugar siloxane (Tab. 2). While the pure polyethersiloxane H gives a clear solution at 1%, the solution obtained with the pure sugar siloxane G is cloudy, and deposits a solid after a while. While not being limited to theory, a reason for this may be the aggregation of sugar radicals caused by strong hydrogen bonds. The amino sugar-polyether-siloxanes may adopt an intermediate position between the two extremes in terms of their physical solubility. In both cases, however, clear to opaque solutions are obtained from which there is no deposition of solid. The additional polyether radicals in the sugar siloxane therefore function, so to speak, as disruptive elements, preventing the aggregation of sugar radicals and hence raising the solubility of sugar siloxanes.

Cloud Point

Silicone polyethers belong to the class of nonionic surfactants which exhibit an inverse solubility behavior in water. In other words, they become more and more insoluble as the temperature rises, which is manifested by the clouding of the aqueous solutions on heating. The temperature at which this clouding occurs on heating, and disappears again on cooling, is known as the cloud point, for whose determination there are DIN specifications.

To examine to what extent the proportion of polyether radicals to sugar radicals affects the cloud point of an aqueous solution of the corresponding sugar-polyether-siloxane, a series of sugar-polyether-siloxanes with the same parent siloxane skeleton but with variations in the sugar radical as proportion of the sum of the sugar and polyether radicals (see Tab. 1) is prepared and their cloud points are determined in an aqueous system in accordance with DIN 53917 (see Tab. 3 and 4). In deviation from the DIN specification, the solutions contain small amounts of isopropanol as a consequence of the preparation process. For the purpose of comparability, however, the isopropanol content is held constant in all solutions measured. As evident from Tab. 3, the cloud point of the pure polyethersiloxane H is 80° C., while no cloud point is observed for the sugar siloxane G up to 120° C. It is also evident that as the sugar radicals increase as a proportion of the sum of sugar and polyether radicals (products A to F) there is likewise an increase in the cloud point. In contrast, the cloud points of corresponding mixtures of pure sugar siloxane and pure polyethersiloxane remain constant and low (see values in parentheses for products A, D and E). The influence of the parent siloxane structure on the position of the cloud point can be estimated from the results in Tab. 4. With a relatively short siloxane chain and an approximately constant number of functional groups per molecule (products I, J and K), the cloud point is raised for a comparable proportion of sugar radical to polyether radical.

On the basis of these examples it is demonstrated that the cloud point of aqueous solutions can be adjusted in a targeted manner or eliminated entirely.

TABLE 3

Cloud points (in accordance with DIN 53917 of 16% strength solutions in water/butyl diglycol/isopropanol (70:24:6) of the amino sugar-polyether-siloxanes A to F from Examples 1 to 8; for comparison, the cloud points of the pure polyethersiloxane H and of the pure sugar siloxane G and, in parentheses, the cloud points of corresponding mixtures of pure polyethersiloxane H and pure sugar siloxane G

| Product | H | A | B | C | D | E | F | G |
|---|---|---|---|---|---|---|---|---|
| Cloud point [°C.] | 80 | 83 (76) | 85 | 92 | 96 (79) | 101 (79) | >120 | >120 |

TABLE 4

Cloud points (in accordance with DIN 53917) of 16% strength solutions in water/butyl diglycol/isopropanol (70:24:6) of the amino sugar-polyether-siloxanes I to K from Examples 9 to 11

| Product | I | J | K |
|---|---|---|---|
| Cloud point [°C.] | 103 | 110 | >120 |

The above description of the invention is intended to be illustrative and not limiting. Various changes or modifications in the embodiments described may occur to those skilled in the art. These can be made without departing from the scope and spirit of the invention.

What is claimed is:

1. An organopolysiloxane copolymer comprising on average at least one polyhydroxyorganyl group and/or sugar group or sugar-derivative group, attached to the siloxane via a spacer, and on average at least one polyoxyalkylene group, of the general average formula

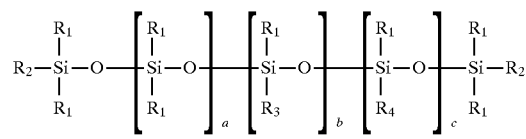

where
$R_1$=alkyl radical of 1 to 4 carbon,
$R_2=R_1$, $R_3$ and/or $R_4$,
and where the indices a, b, and c are integers within the stated ranges
a=0 to 200,
b=0 to 50,
c=0 to 50,
with the proviso that at least one radical $R_3$ and $R_4$ is present in each case,
$R_3$=polyoxyalkylene of the general average formula

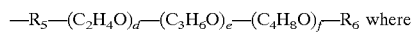

d=0 to 100,
e=0 to 100,
f=0 to 100,
with the proviso that at least one of the indices d, e or f is $\geq 1$,
$R_5$=alkyleneoxy radical having 1 to 20 carbon atoms which is optionally branched and/or can contain double bonds,
$R_6$=hydroxyl, alkoxy or acyloxy radical having 1 to 20 carbon atoms,
$R_4$=radical of the general formula —$R_7$—PH, the radical $R_7$ functions as a spacer between siloxane skeleton and polyhydroxy-organyl radical and/or sugar radical, with the exception of a polyether radical,
PH is a polyhydroxyorganyl radical containing a defined number n of (C—OH) groups, where n is $\geq 2$.

2. An organopolysiloxane copolymer as claimed in claim 1, wherein
a=1 to 150,
b=1 to 30,
c=1 to 30
and the quotient b/c is about 0.1 to about 10.

3. An organopolysiloxane copolymer as claimed in claim 1, wherein
a=10 to 100,
b=1 to 20,
c=1 to 20
and the quotient b/c is about 0.25 to about 4.

4. An organopolysiloxane copolymer as claimed in claim 2, wherein
b and c are 10.

5. An organopolysiloxane copolymer as claimed in claim 3, wherein
b and c are 4.

6. An organopolysiloxane copolymer as claimed in claim 1, where n is from 5 to 15.

7. An organopolysiloxane copolymer as claimed in claim 1, wherein the radical PH is a radical of a mono-, di-, oligo- or polysaccharide, its glycoside or corresponding derivative.

8. An organopolysiloxane copolymer as claimed in claim 1, wherein the linking of the spacer $R_7$ to the polyhydroxyorganyl radical PH is by way of an acetal, ester, amide, ether, thioether or amine bond.

9. An organopolysiloxane copolymer as claimed in claim 1, wherein the linking of the spacer $R_7$ to the polyhydroxyorganyl radical PH is a hydrolysis-stable ether, thioether or amine bond obtained by reacting an amino-functional sugar derivative with an epoxy-functional siloxane.

10. The organopolysiloxane copolymer as claimed in claim 1, wherein the sugar radical is selected from the group consisting of glucose, maltose, raffinose, sorbitol, glucosamine, glucopyranosylamine, glucamine, N-methylglucamine, isomaltamine, gluconic acid and heptagluconic acid.

11. An organopolysiloxane copolymer as claimed in claim 1, which has the formula

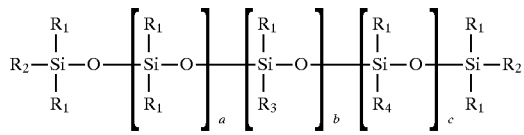

wherein
a=1, b=1, c=1,
$R_2=R_1$;

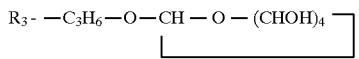

$R_4 = —C_3H_6—(C_2H_4O)_{10} —OH$.

12. An organopolysiloxane copolymer as claimed in claim 1, which has the formula

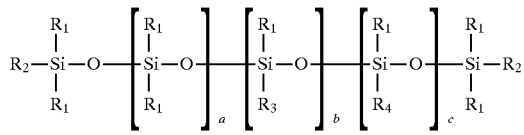

wherein
a=25, b=5, c=5;
$R_1=R_2$
$R_3 = —C_3H_6—NH—CO—(CHOH)_4CH_2OH$; and
$R_4 = —C_3H_6—(C_2H_4O)_5—(C_3H_6O)_5—OCH_3$.

13. An organopolysiloxane copolymer as claimed in claim 1, which has the formula

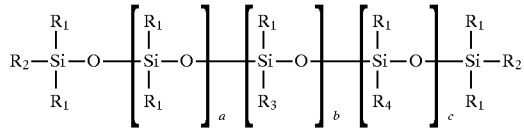

wherein
a 1, b=1, c=1;

$R_2=R_3$
$R_3 = —C_3H_6—O—CH_2(CHOH)CH_2—O—CO—(CHOH)_4CH_2OH$; and
$R_4—C_6H_{12}—(C_2H_4O)_{10}—(C_3H_6O)_3—OH$.

14. A process for preparing an organopolysiloxane copolymer as claimed in claim 1, which comprises first reacting a polyorganohydridosiloxane by cohydrosilylation with a polyether and with a compound that is capable of reaction with a polyhydroxyorganyl compound or derivatives thereof, and in a second stage reacting the polysiloxane, with the polyhydroxyorganyl compound.

15. The process as claimed in claim 14, which first comprises reacting a polyorganohydridosiloxane by cohydrosilylation with a polyether and with a compound carrying a terminal epoxy group, and in a second stage reacting the epoxy-functional polyethersiloxane with a polyhydroxyorganyl compound that contains a nucleophilic hydroxyl, mercapto or amino group.

16. A cosmetic formulation which comprises an organopolysiloxane copolymer as claimed in claim 1.

17. The formulation according to claim 16, wherein the formulation is a skin or hair conditioner or a formulation for cleansing the skin or hair.

18. An oil-in-water or a water-in-oil emulsion which comprise an organopolysiloxane copolymer as claimed in claim 1 as the emulsifier.

19. A plastic or polymer which comprises an organopolysiloxane copolymer as claimed in claim 1.

20. In a method for preparing polyurethane foams, the improvement which comprises adding an organopolysiloxane copolymer as claimed in claim 1.

21. In a method for preparing additive packets for fuels, the improvement which comprises adding an organopolysiloxane copolymer as claimed in claim 1.

22. In a method for improving the surface qualities of a coating, the improvement which comprises adding an organopolysiloxane copolymer as claimed in claim 1.

23. The method as claimed in claim 22 wherein the coating is an aqueous media.

24. The method as claimed in claim 22 wherein the coating is an ink or paint.

25. A method for reducing the surface tension of an aqueous solution or for reducing the interfacial tension between two liquids or between a liquid and a solid which comprises adding an organopolysiloxane copolymer as claimed in claim 1.

* * * * *